No. 766,632. PATENTED AUG. 2, 1904.
J. G. LOVE.
FERTILIZER DISTRIBUTER.
APPLICATION FILED DEC. 16, 1903.
NO MODEL. 2 SHEETS—SHEET 1.
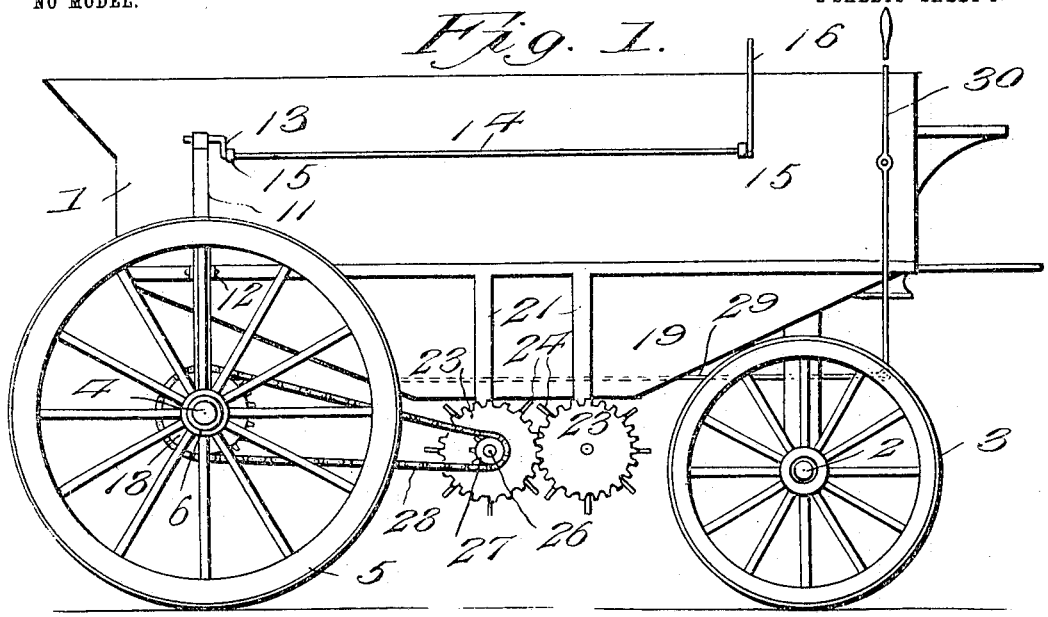
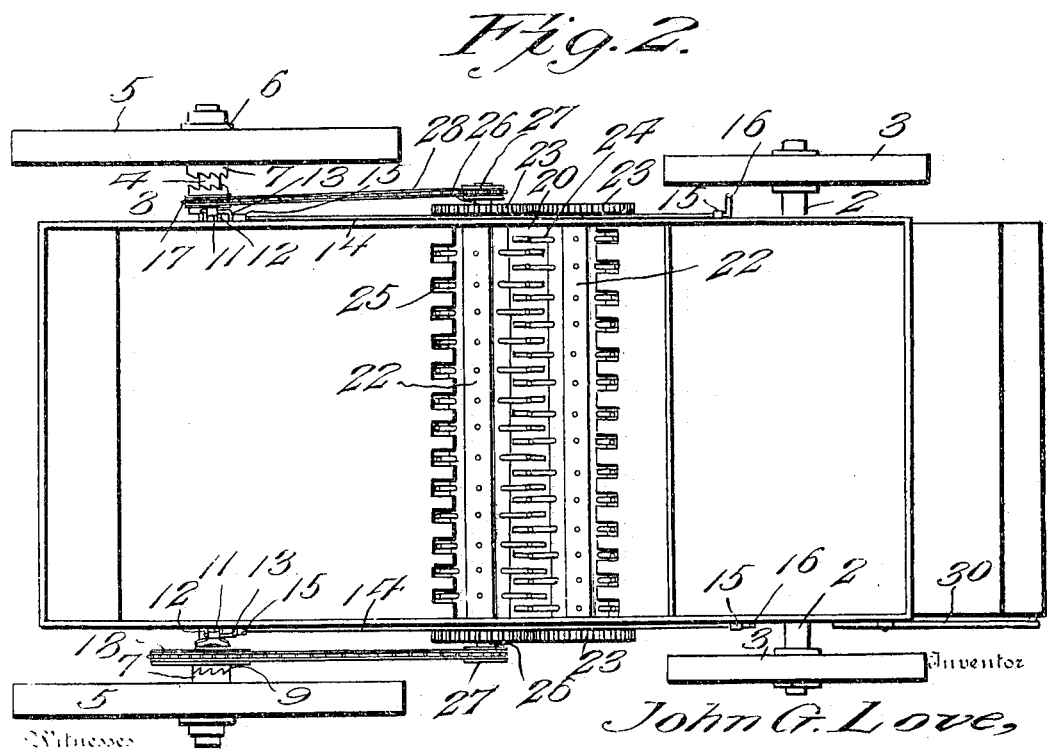
Inventor
John G. Love,
By Victor J. Evans
Attorney
Witnesses

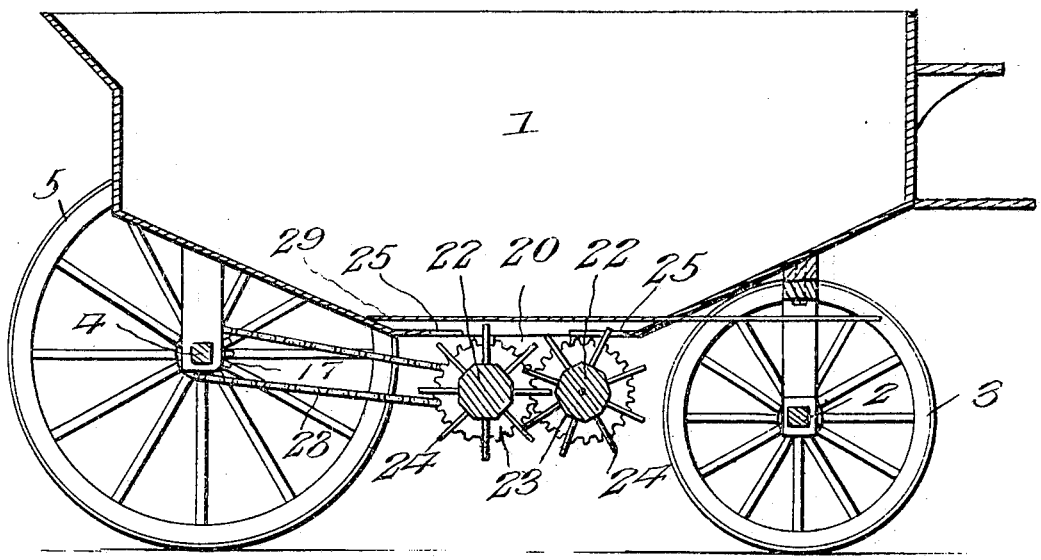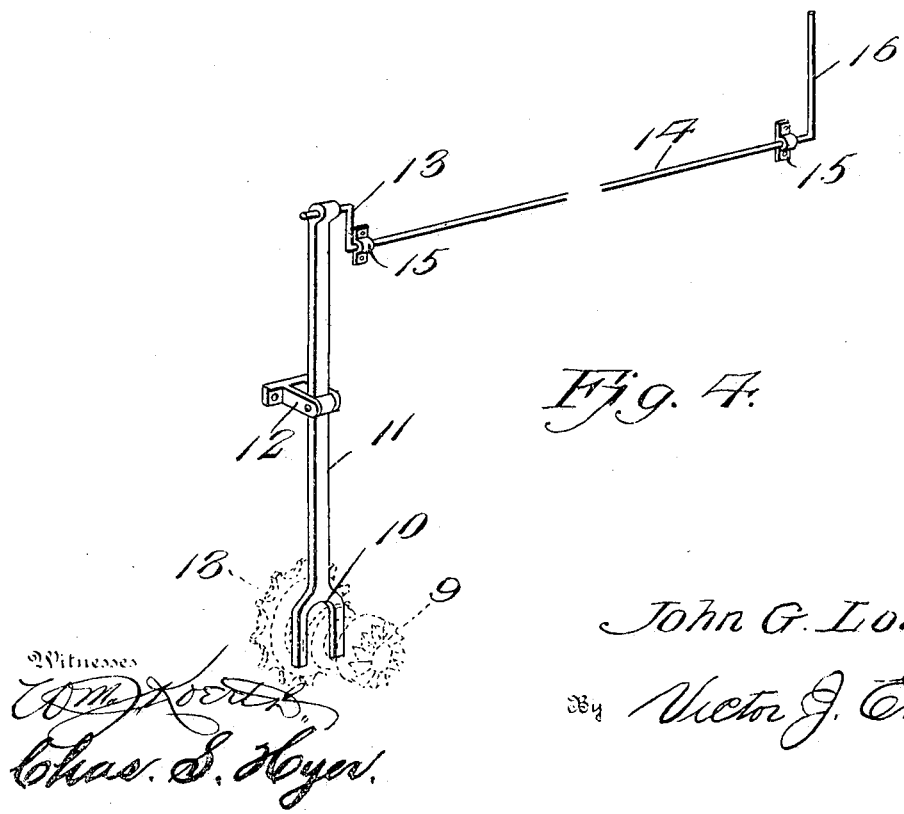

No. 766,632. Patented August 2, 1904.

UNITED STATES PATENT OFFICE.

JOHN GRACIE LOVE, OF SYRACUSE, NEW YORK.

FERTILIZER-DISTRIBUTER.

SPECIFICATION forming part of Letters Patent No. 766,632, dated August 2, 1904.

Application filed December 16, 1903. Serial No. 185,440. (No model.)

*To all whom it may concern:*

Be it known that I, JOHN GRACIE LOVE, a citizen of the United States, residing at Syracuse, in the county of Onondaga and State of New York, have invented new and useful Improvements in Fertilizer-Distributers, of which the following is a specification.

This invention relates to a manure spreader or distributer; and the primary object of the same is to provide a wagon-like receptacle with a feeding-bottom under which is disposed oppositely-movable distributing devices connected by differentiating gearing or driving mechanism adapted to be thrown into engagement with the rear wheels of the receptacle to regulate the speed of movement of the said distributing devices in accordance with the amount of manure to be deposited on the ground-surface.

The invention consists in the construction and arrangement of the parts, which will be more fully hereinafter set forth.

In the drawings, Figure 1 is a side elevation of a manure-spreader embodying the features of the invention. Fig. 2 is a top plan view of the same. Fig. 3 is a longitudinal vertical section thereof. Fig. 4 is a detailed perspective view of a part of the operating-gear devices and mechanism for shifting the same, said devices being illustrated in dotted lines.

Similar numerals of reference are employed to indicate corresponding parts in the several views.

The numeral 1 designates a body assimilating an ordinary wagon-body disposed on running-gear having front axles 2, with wheels 3 thereon, and rear axles 4, provided with wheels 5. The front axle 2 is adapted to turn under the body 1 through the operation of a fifth-wheel, center bolt, or other analogous device. The hubs 6 of the rear wheels have inwardly-projecting clutch members 7 fixed thereto, and slidable on the opposite extremities of the axle 4 are companion clutch members 8 and 9, each of which has a portion thereof embraced by the lower yoked extremity 10 of a shifting-lever 11, fulcrumed at an intermediate point in a bracket 12, secured to the side of the body 1. The upper end of each shifting-lever 11 is engaged by the rear crank extremity 13 of a shifting-rod 14, which extends along the side of the body 1 and is movable in bearing-clips 15, secured in longitudinal alinement to the body. The front extremity of the shifting-rod 14 is bent at an angle and extended above the upper edge of the body to form an operating grip or handle 16, which is disposed within convenient reaching distance of the driver or operator of the spreader. The clutch member 8 has a comparatively small sprocket-wheel 17, forming a part thereof or secured thereto, and the clutch member 9 has a sprocket-wheel 18 connected thereto and of materially greater diameter than the sprocket-wheel 17 for a purpose which will be presently explained. Either of the clutch members 8 or 9 may be quickly thrown into operative engagement with the clutch members 7 by the actuation of the shifting-rods 14 and levers 11.

The bottom 19 of the body depends and is shaped to form an outlet-hopper having a transverse opening 20, extending through the center thereof. In suitable hangers 21, depending from the body, distributing-rollers are rotatably held and have intermeshing gears 23 of equal dimensions on their opposite extremities outside of the plane of the opposite sides of the hopper-bottom. The distributing-rollers are also formed with a series of radiating teeth 24, and the rollers are in such close relation that these teeth pass between each other, the teeth being so disposed on the opposing rollers that this operation may practically ensue. The rollers 22 with their teeth extend fully under the opening 20 in the bottom of the hopper, and the under walls of said opening have slots 25 formed therein at regular intervals to allow the teeth of the opposite rollers to move therethrough, and thus provide for a close arrangement of the rollers under the bottom of the hopper and prevent the manure or fertilizing material from being wasted. The ends of the rearmost rollers 22 are projected in the form of stub-shafts 26, and thereon are secured sprocket-wheels 27, one on each end, both sprocket-wheels being of the same dimensions and surrounded by chain belts 28, also respectively engaging the sprocket-wheels 17 and 18 of the clutch members 8 and 9. The distributer will also be provided with suitable drafting devices, and the several parts may be varied at will.

From the foregoing description the operation will be readily understood. The manure or fertilizing material is deposited in the body 1 and gradually fed down or settles toward the opening 20 in the hopper-bottom. The rapidity of feed or distribution of the manure or fertilizing material being first determined, the clutch member bearing the sprocket-wheel which will produce such rate of feed is adjusted to engage its companion member 7. As shown by Fig. 2, the clutch member 9, bearing the larger sprocket-wheel 18, is shown in engagement with the clutch member 7 on the adjacent wheel 5. When the parts are in this arrangement and the spreader is propelled, the distributing-rollers will be actuated at a rate of speed slower than when the clutch member 8, bearing the smaller sprocket-wheel 17, is in operative engagement with the wheel 5, controlling the operation of the same. By this means the speed of the rollers may be quickly changed at any time found necessary to meet the demands of a rapid or slower distribution of the manure or fertilizing material. Both rollers are so geared that when set in motion they will rotate inwardly toward each other, and the manure or fertilizing material will be drawn down between the rollers and pass out through the center of the hopper-bottom in a broken-up condition, with better results in equally applying the same over the ground-surface. When it is desired to have the rollers 22 remain inactive, the clutch members 8 and 9 are both shifted inwardly to disengage the same from the members 7, and in this condition the spreader may be propelled without waste of the manure or fertilizing material.

The improved device will be found exceptionally useful for the purpose for which it has been devised, and to completely close the outlet-opening of the hopper-bottom a longitudinally-movable slide 29 is disposed in the said bottom at a slight elevation above the opening 20 and operative from its front extremity by a lever 30, fulcrumed on one side of the front end of the body within easy reaching distance of the operator or driver. While it is preferred to use this cut-off slide, it will be understood that said slide is not actually necessary. This slide may also be adjusted to regulate the amount of manure or fertilizing material delivered to the opening. It will also be seen that as the radial pins 24 of the two rollers move upwardly through the slots 25 escape of the manure or fertilizing material through the said slots will be prevented, and the inward movement of the rollers toward each other will always tend to throw or direct the manure or fertilizing material toward the delivering-opening between the said rollers.

Having thus described the invention, what is claimed as new is—

1. A spreader of the class set forth consisting of a body having a hopper-shaped bottom with an outlet-opening, front and rear axles on which said body is disposed, distributing-rollers disposed under said opening of the body and having intermeshing gears at opposite extremities, one of said rollers also having driving-sprockets at opposite ends, the rollers rotating inwardly toward each other, and shiftable clutch devices on the rear axle having sprockets differentiating in diameter and connected to the sprockets on the one roller whereby the speed of the rollers may be differentiated.

2. A spreader of the class set forth, consisting of a body having a hopper-shaped bottom with an opening extending transversely thereof, distributing-rollers rotatably mounted under the said opening and having intermeshing gears at their opposite extremities, the rear roller also being provided with sprocket-wheels for actuating both rollers, clutch devices carrying sprocket-wheels, the sprocket-wheels of the clutch devices differing in diameter, and connecting means between the sprocket-wheels of the clutch devices and the sprocket-wheels on one of the rollers, the clutch devices being independently adjustable to throw them into and out of operative position.

3. A distributer of the class set forth, consisting of a body having a hopper-shaped bottom therein, distributing-rollers disposed under said bottom and having intermeshing gears on the opposite extremities thereof, one of the rollers being provided with driving devices, front and rear wheels on which the body is disposed, shiftable devices coöperating with the rear wheels at opposite sides and having driving devices in connection therewith varying in diameter, and means for operatively attaching the driving devices on one of the rollers and the driving devices coöperating with the rear wheels.

In testimony whereof I affix my signature in presence of two witnesses.

JOHN GRACIE LOVE.

Witnesses:
GEORGE H. JAQUIN,
ROBERT S. WHITEHEAD.